United States Patent [19]

Walsh, Jr.

[11] Patent Number: 5,186,960

[45] Date of Patent: Feb. 16, 1993

[54] LOW PRESSURE 3D EXTRUSION

[76] Inventor: Thomas J. Walsh, Jr., 2 Deer Run Rd., Poughkeepsie, N.Y. 12603

[21] Appl. No.: 610,146

[22] Filed: Nov. 7, 1990

[51] Int. Cl.⁵ .............................................. B29C 47/00
[52] U.S. Cl. .................... 425/376.1; 425/378.1; 425/380; 425/381; 425/382.3
[58] Field of Search ............... 264/40.7, 167, 175, 264/176.1, DIG. 81; 425/381, 208, 380, 378.1, 367, 329, 382.3, 376.1

[56] References Cited

U.S. PATENT DOCUMENTS

| | | | |
|---|---|---|---|
| 1,440,007 | 12/1922 | Freeman et al. | 425/329 |
| 1,603,812 | 10/1926 | Stein | 264/175 |
| 1,900,940 | 3/1933 | Kirschbraun | 264/175 |
| 2,515,243 | 7/1950 | Lyon | 264/175 |
| 2,657,427 | 11/1953 | Upton | 264/176.1 |
| 3,019,483 | 2/1962 | Schultheiss | 264/167 |
| 3,274,645 | 9/1966 | Chase | 425/367 |
| 3,355,769 | 12/1967 | Fogelberg | 425/208 |
| 3,359,597 | 12/1967 | Bainton | 425/367 |
| 3,394,431 | 7/1968 | Nalle, Jr. | 264/167 |
| 3,408,694 | 11/1968 | Matsuoka | 425/378.1 |
| 3,525,785 | 8/1970 | Fairbanks | 425/381 |
| 3,555,128 | 1/1971 | Schrenk | 264/40.7 |
| 3,592,718 | 7/1971 | Fairbanks | 264/167 |
| 3,694,120 | 9/1972 | Walton | 425/381 |
| 3,841,814 | 10/1974 | Eckhardt | 425/208 |
| 3,872,197 | 3/1975 | Kato et al. | 264/40.7 |
| 4,060,368 | 11/1977 | Theysohn | 425/380 |
| 4,174,200 | 11/1979 | Hoj | 425/378.1 |
| 4,191,723 | 3/1980 | Vangiu et al. | 264/175 |
| 4,256,448 | 3/1981 | Carle | 264/175 |
| 4,372,736 | 2/1983 | Gooch et al. | 425/367 |

FOREIGN PATENT DOCUMENTS

168075 7/1954 Australia .
1060783 4/1954 France .

Primary Examiner—David A. Simmons
Assistant Examiner—William J. Matney, Jr.
Attorney, Agent, or Firm—Joseph B. Taphorn

[57] ABSTRACT

Apparatus for discharging sheets having skins on them and different patterns, characteristics, and properties. One or more rollers, belts, plates, or combinations thereof, having cavities and projections of desired patterns formed on their surfaces, pass through low pressure liquefied extrudable materials to be bathed thereby and pass by another surface(s). Heating or cooling is applied as appropriate to the roller(s), plate(s), belt(s), to form a skin on the extrudate and/or set same. A distributed low pressure, mixed orientation, low gas, liquefied extrudable material is generated using a vented barrel assembly and manifold mechanism. By using a dynamic moving die surface, bathed in a low pressure material chamber, rather than extrudable material forced through a fixed die opening as is normally done in extrusion processes, a product with low stress and one that exhibits isotropic properties results. Additionally, the dynamic moving die surface can be used to embed and fuse useful patterns, circuits, or post-operation films.

10 Claims, 5 Drawing Sheets

MIXING SHAFT ROTATED 90°

LOW PRESSURE 3D EXTRUSION

BACKGROUND OF THE INVENTION

1. Field of the Invention

This invention relates to sheet discharging or extrusion apparatuses, and more particularly, to thermally controlled low pressure discharging apparatuses and their products including low strain and reduced orientation sheets.

2. Discussion of Prior Information

Low pressure discharging devices are known. See for example applicant's application "'Green' Sheet Manufacturing Methods and Apparatuses" filed May 9, 1990 under serial number 07/521,020. Therein a ceramic slurry or paste at ambient temperature is shown as being fed directly from a bin holding same through the throat of a pair of moving surfaces, one a roller and the other an endless belt transporting a "green" sheet to a pair of rollers each bearing punches mating with those on the other or bearing other projections to form through holes, other holes, surface patterns, or flat surfaces, in the discharged sheet.

SUMMARY OF THE INVENTION

It is an object of this invention to impart through holes, other holes, surface patterns and flat surfaces in or on a discharged sheet as it is being formed.

It is also an object of the invention to provide discharged sheets having raised surfaces.

It is another object of the invention to provide discharged sheets which have isotropic characteristics and properties. Normal extrusion processes and apparatuses produce sheets that have distinct anisotropic characteristics and properties. Having a sheet with low strain and random orientation allows for laminating of same into stable multi-layered objects such as printed circuit boards, electronic substrates etc.

Another object of this invention is to provide means allowing the simultaneous introduction of decal or layer films on the discharged sheets.

Still another object of this invention is to provide such sheet discharging apparatuses which are simple and inexpensive in operation and construction.

The objects of the invention are achieved by the use of a thermally controlled surface or surfaces of a moving bathing element or elements (wetting) in a low pressure supply of preferably disoriented, extrudable, calenderable material.

Geometries in or on the moving surface determine the patterns created on the sheets. The thermal control (either heating or cooling, as appropriate,) enables a hard skin to be formed on the extrudate material in direct contact with it, and the extrudate material in contact with the hard skin to be dragged out into the discharged sheet with a minimum of force, avoiding the material orientation effects of normal sheet discharging or extrusion methods and apparatuses. A low pressure supply of disoriented extrudable material is a unique extension of the invention.

In one embodiment, two coacting discharging rollers are the moving surfaces. The rollers rotate so as to be bathed wet by and remove material from a low pressure chamber behind them and to discharge a sheet (or the extrudate) in front of them. Cavities or other geometries on the surfaces of the rollers determine the patterns if any created in the sheet.

In a second embodiment, a takeoff belt interacts with a coacting roller, both being bathed with the extrudate in the low pressure chamber. The extrudate sheet is discharged out between the belt and the roller and is transported by the belt during which time it may set up. The belt is supported on a plate that also controls the belt temperature for further sheet curing effects. A decal film with patterns or circuits can be introduced between the belt and the extrudate sheet for laminating or fusing to the extrudate sheet.

In a third embodiment, a takeoff belt interacts with a coacting belt, both being bathed with the extrudate material in the low pressure chamber to discharge the sheet out between the belts for sizing. The two belts may be supported or backed up by plates that provide additional temperature control. The result is a dynamic die that moves but does not orient the sheet material as compared with a high pressure forcing an extrudate through a fixed die which results in orientation of the extruded sheet. The plates may be given different temperatures in different areas to produce a thermally profiled dynamic die. Likewise, as in the second embodiment, decaled or circuited, patterned or follow-on processing film or films can be introduced for laminating or fusing to the extrudate sheet.

In a fourth embodiment, two discharge rollers, instead of coacting directly with each other, coact with a plate between them. Each may have its own low pressure chamber supplying the same or different materials. Two different sheets may be discharged for subsequent lamination, package forming, or other operations. Additionally, although herein shown with two extrudate barrel feeder assemblies in line, the barrel feeder assemblies could be angularly oriented with respect to each other and the low pressure chambers, thus facilitating cross orientation of the extrudate in the chambers and hence cross orientation in the laminated sheets.

The extrudate material to be discharged may be of any variety of materials including slurries, filled or unfilled, crystalline, amorphous, liquid crystal polymers, and/or blends of polymers. A thin skin is imparted to the extrudate by suitably adjusting the temperature of the discharging roller or belt. The thin skin imparted to the extrudate not only hardens any patterns created on the extrudate sheet, but also drags along the material to be the interior of the discharged sheet. It also aids the earlier handling of the discharged sheet which may still have a soft interior or other portion. The soft interior below the skin is thus held in place until hardened, cured and/or fused. Roller or belt temperatures may be controlled by conventional means.

The low pressure chamber for the discharging operations may be supplied by a barrel feeder assembly. The barrel feeder assembly includes a feeder screw having a helix-like thread on its outer surface coacting with the inside of a cylinder to transport extrudable material through different pressure areas; from a bin source of particulate material at one end, to the other end where it may emerge as a liquefied material in the low pressure chamber from whence it is then discharged in the sheet form. Rather than deliver the material directly into the chamber which extends laterally behind the length of the roller or rollers and/or belt or belts, to insure its lateral dispersion while enabling the use of a small chamber, the output of a barrel feeder assembly is delivered to a laterally-extending distribution-mixing baffle or manifold. The distribution-mixing baffle or manifold is suitable apertured along its length to assure an even delivery of the extrudable material from the barrel feeder assembly across the length of the roller chamber. Moreover, the apertures may be randomly directed to abet random orientation of the extrudable material. Furthermore, a mixing shaft can be incorporated within the chamber to provide additional random orientation mixing.

The rotating body of the feeder assembly is of a typical construction to mount one or more extruder screw threads. Although shown as a single screw per chamber, dual coacting screws can be used in each chamber if desired.

The screw design is such that pressure differentials exist within the barrel feeder assembly because of the varying depth of the extruder screw material channel. The depth varies from a relatively deep end because of the smaller root diameter of the screw at the feed section, to a shallower higher pressure area towards the middle to give a liquefying, homogenization and mixing of the material. Thence it goes to a low pressure area at the front for low pressure delivery of the liquefied material to, and through the baffle mixing manifold, into the material reservoir or chamber. Suitable venting of the cylinder enables removal of the volatiles which if left in the extrudable materials can create blow holes, delamination and/or other problems in the discharged sheet and which can be detrimental to multi-layer fabrications.

Once past the high pressure mixing area of the screw, the channel depths of the screw are gradually increased to the low pressure front, thereby gradually reducing pressure and reducing feedback of the melted material over the lands of the screw.

A feature of the invention is that three-dimension extrusions of varying patterns, shapes and characteristics can be readily created and held. Patterns and shapes can be controlled by cavity or raised geometries on the surface of the roller, rollers and/or belt or belts combinations, and the skin hardening temperatures thereon. Characteristics are not only controlled by the tool geometries, but also by temperatures of the rollers, belts, and by the extrudate material properties.

Another feature of the invention is that the discharged sheets are formed without distortion or severe internal stresses. This is because at the time the shapes and patterns are being imparted, the material is under low pressure, is being dynamically dragged rather than forced out with high pressure, and is just leaving in a very fluid state and not yet heat set.

Still another feature of the invention resides in the line contacts between a roller or belt and the other roller, belt or plate being bathed in a low pressure supply of extrudable material. Line contact at any point shuts off the extrudate and can be a very small area to create a through-hole. If the minute line contact is of very short length and width, a very small hole can be created. Desired tool geometries can be readily formed by machining, chemically etching or otherwise removing material from or leaving it on surfaces of the rollers, cylinders, belt or belts, screws or plate, by known technologies.

A further feature of the invention is that sheets of extrudate material can be formed which are isotropic. This is particular significant for liquid crystal polymers (LCPs) which can then be optimally used in multi-layered dense electronic packaging.

An advantage of the invention is that there is no need for high pressure as in the conventional extrusion of polymers, thus reducing wear and costs on tools. Tight seal are not required, and conventional seals will do.

Another advantage is that the limited roller line contact and low pressure supply of extrudable material results in greatly reduced forces being needed for extrudate discharging and for tooling counter forces, resulting in significant energy savings.

BRIEF DESCRIPTION OF THE DRAWINGS

These and other objects, features and advantages of the invention will be apparent from a reading of the following description when considered with the accompanying drawings wherein:

FIG. A is a schematic vertical cross-sectional view of one embodiment of the invention;

FIG. B is a schematic similar to that of FIG. A except it shows the use of a belt as one of the discharging elements;

FIG. C is a schematic vertical cross-sectional view of another embodiment of the invention—a set of belts creating a dynamic die;

FIG. D is a schematic vertical cross-sectional view of another embodiment of the invention using rollers coacting with a plate;

FIG. E is an isometric view of a section of a plain sheet of film of extrudate, and in displaced relationship a circuited film layer;

FIG. F is an isometric view of a section of an extrudate sheet or film formed on one surface with pyramids useful in energy absorbing packaging, for example;

FIG. G is an isometric view of a section of an extrudate sheet or film having large holes to form a grid or mesh useful as a screen, for example; and FIG. H is an isometric view of a section of an extrudate sheet or film having small through holes.

DETAILED DESCRIPTION OF EMBODIMENTS

Figure 1:
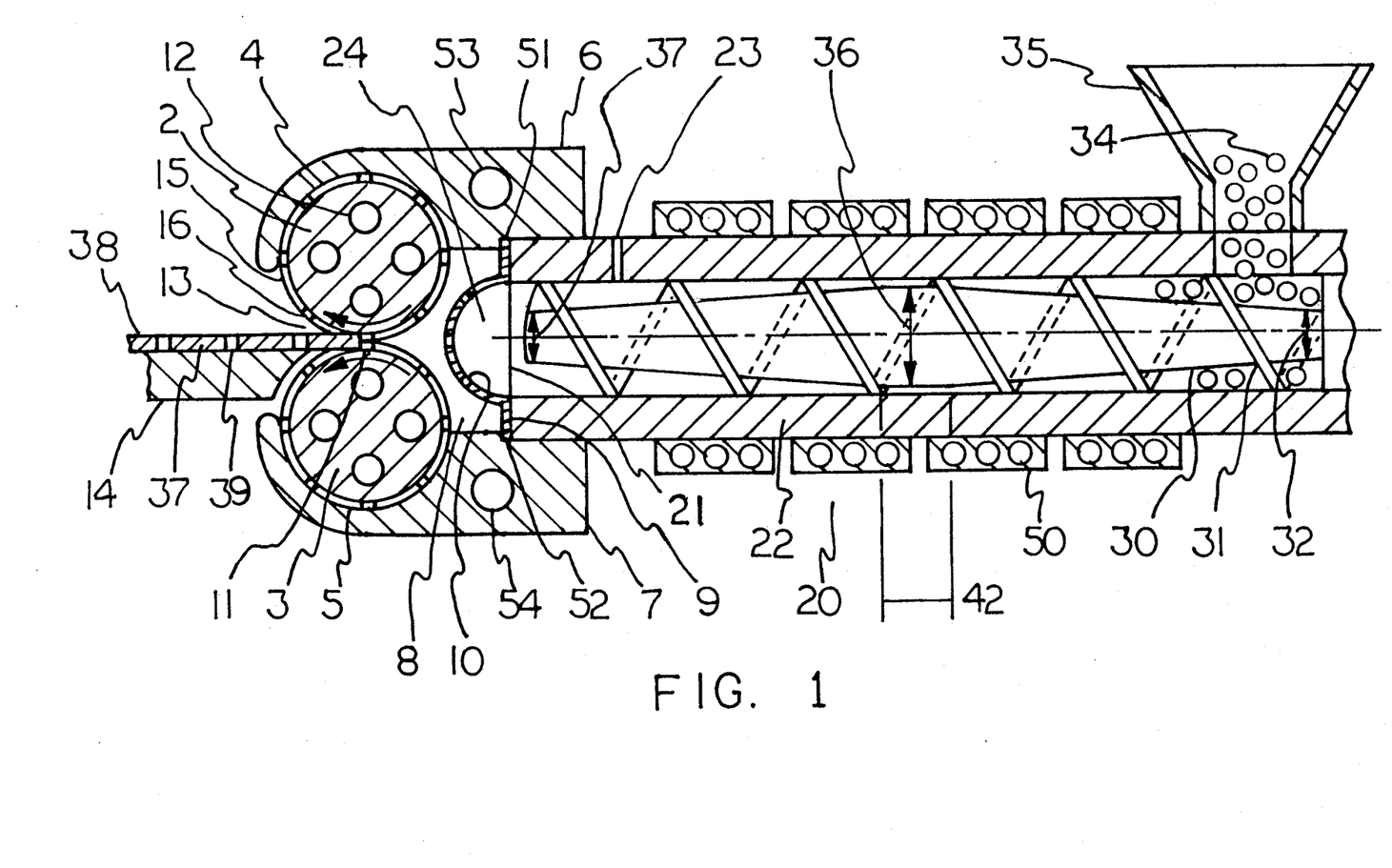
Figure 2:
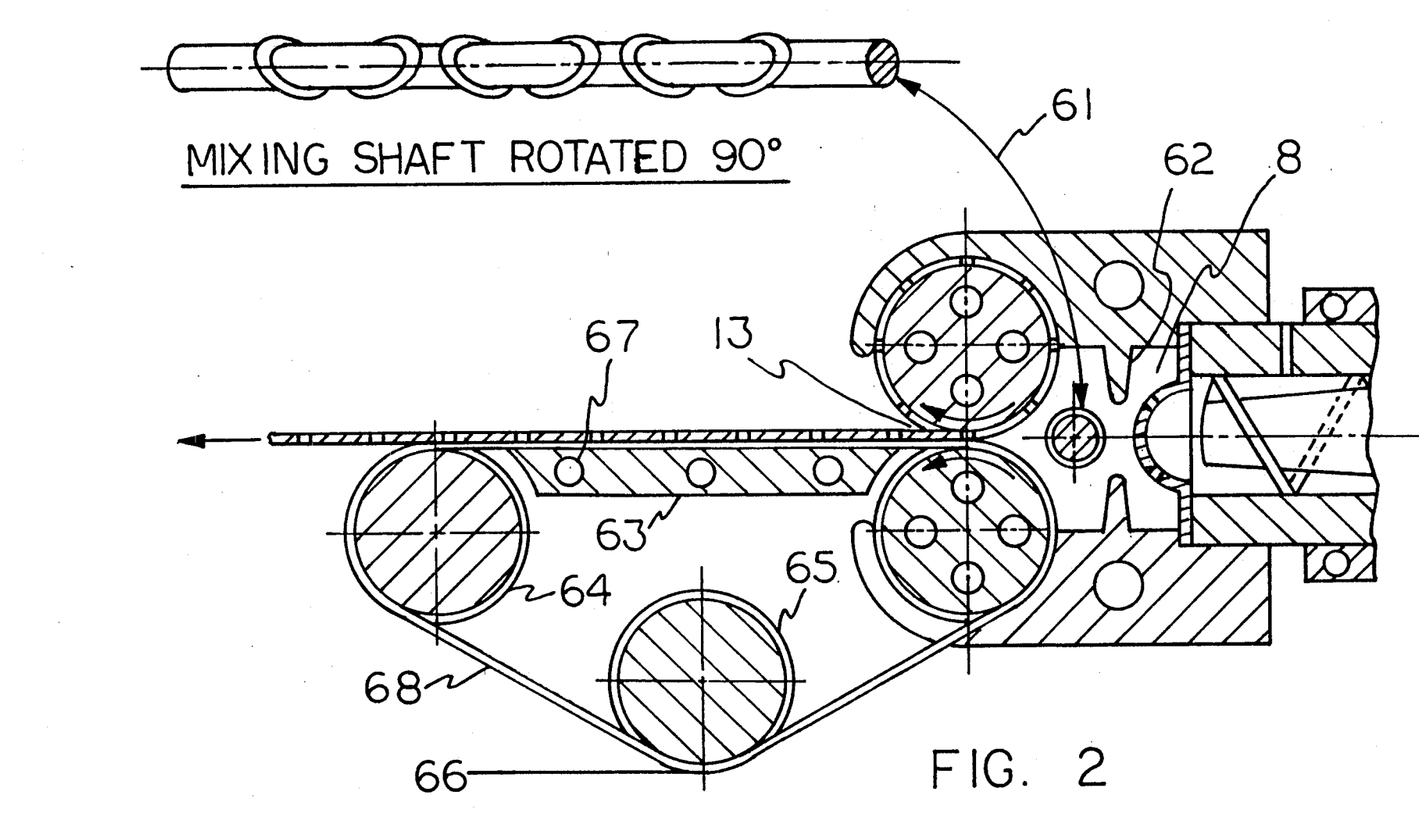
Figure 3:
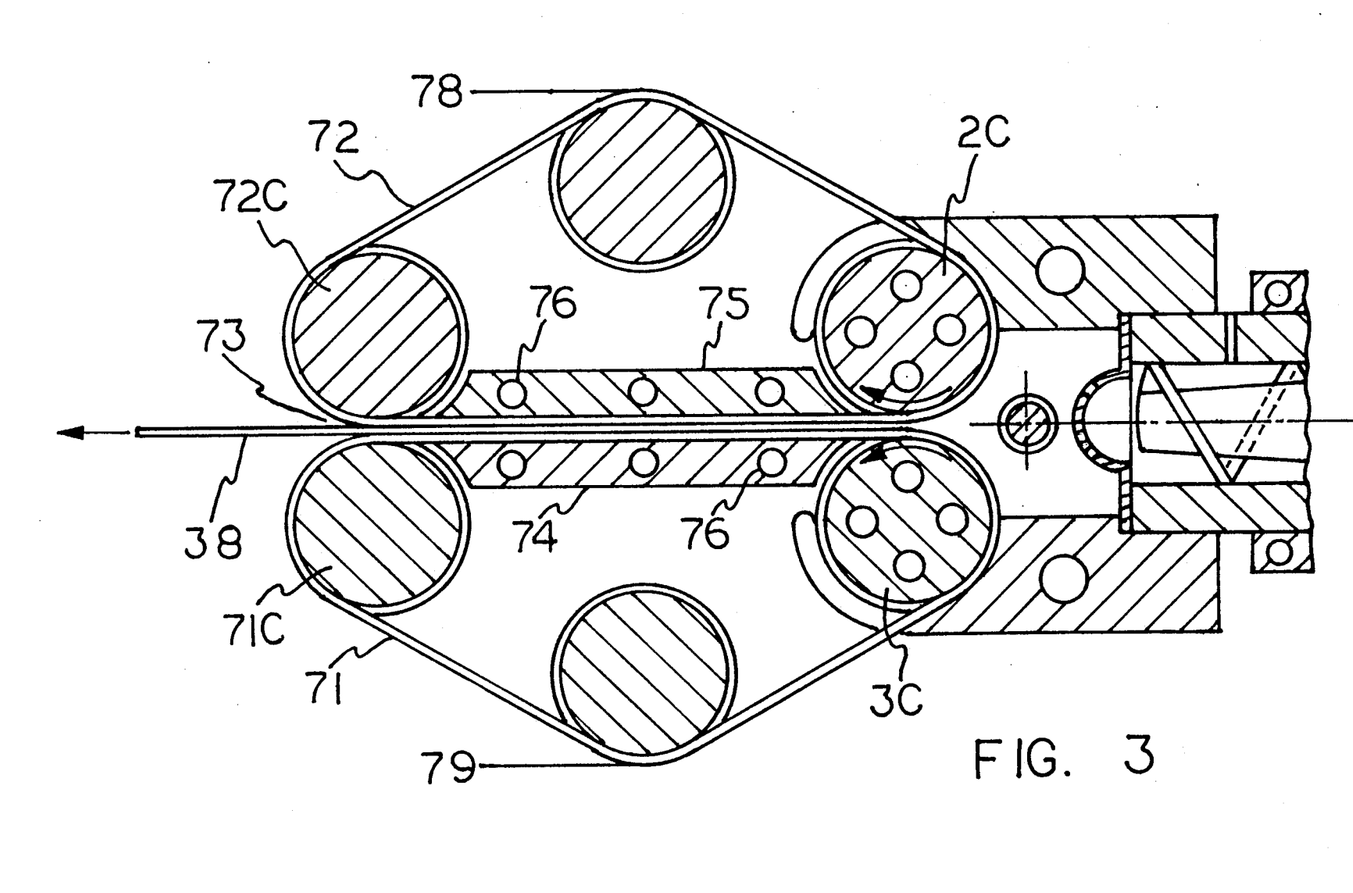
Figure 4:
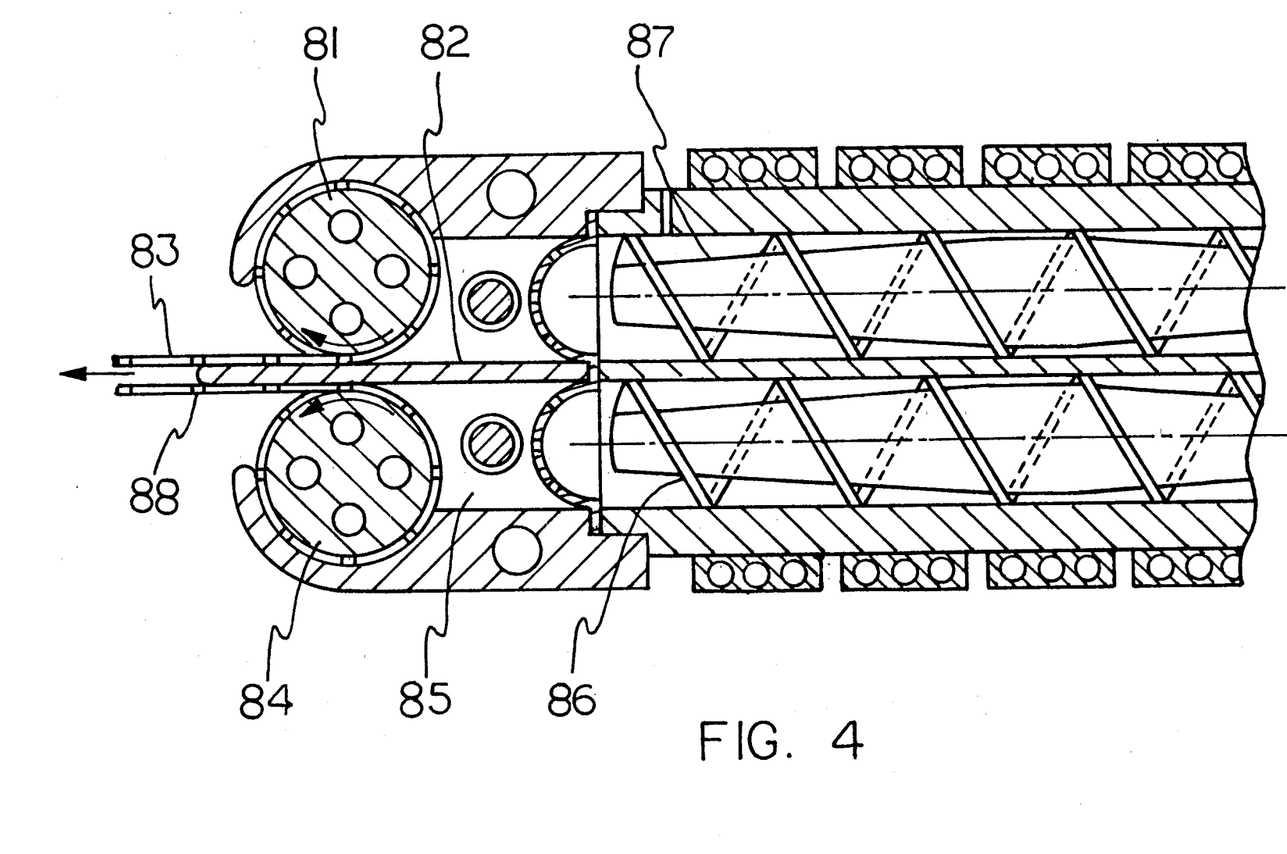
Figure 5:
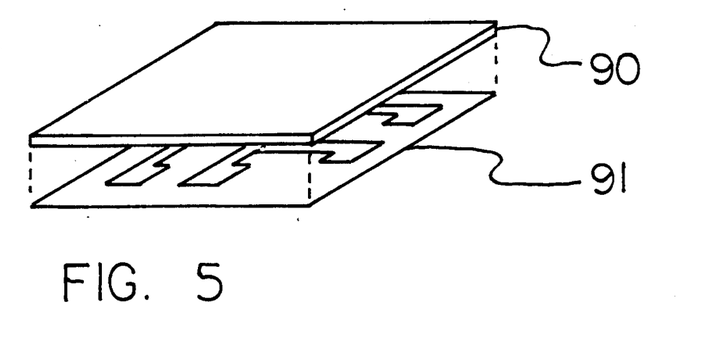
Figure 6:
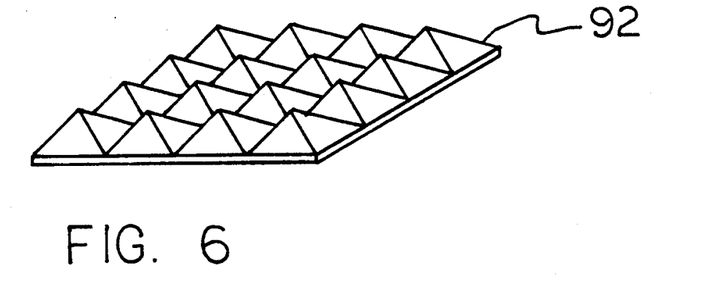
Figure 7:
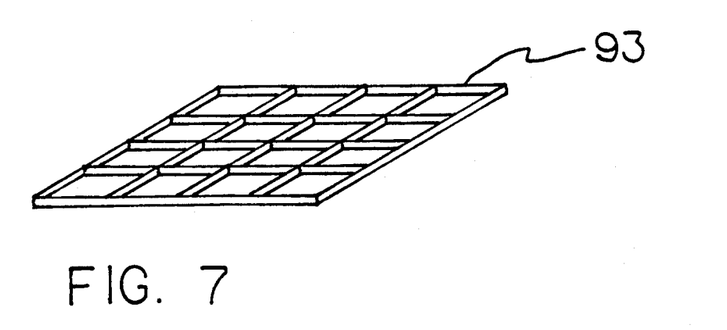
Figure 8:
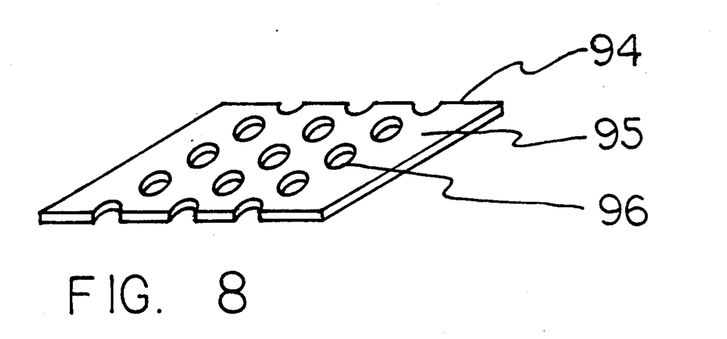

Referring more particularly to FIG. A of the drawings, there is shown therein a discharging assembly generally indicated by the number 1, a driven pair of coacting upper and lower rollers 2 and 3 being suitably journaled and synchronized and making line contact 11 where desired with each other on the high portions of their peripheral surfaces. The rollers 2 and 3 include suitable conduits 12 for heating or refrigerating fluids, or electric heat elements to appropriately heat or cool the rollers during discharging operations. Associated with rollers 2 and 3 are upper and lower roller retainers 6 and 7 extending across the width of the rollers and interconnected at their ends by sidewalls. The forward ends of the retainers contain custom surfaces 4 and 5 closely embracing the peripheries of the respective rollers 2 and 3 and acting to restrain to the surfaces of the rollers the laterally outward flow of liquefied extrudable materials which would be contained by a chamber 8; the rollers acting to carry escaping material back into the chamber. The front of the chamber is defined by the coacting discharging rollers 2 and 3, where it bathes them with liquefied extrudable material.

The back of chamber 8 is defined by a distribution-mixing baffle or manifold 9 extending across the width of the chamber. The manifold is curved in vertical cross section. It is suitably apertured as at 10 to allow for a distributed and mixed delivery of low pressure liquefied extrudable material across the width of chamber 8; the apertures 10 may be randomly directed for extrudate disorienting purposes. The baffle 9 sits within a recess 51 and 52 formed in the back of the upper 6 and lower 7 retainers. Near their lateral midpoint the retainers 6 and 7 fixedly receive within their recesses 51 and 52, the dispensing end 21 of a supply cylinder 22 of a barrel feeder assembly 20.

Within a cylinder 22 of the barrel feeder assembly 20, is a feeder screw having on a rotatable body 30 a helically wound screw thread 31 operative on forward-moving counterclockwise-rotation as seen from a hopper 35, to move materials 34 falling out of the hopper 35 into the cylinder 22 towards the baffle/manifold 9.

The depth of the screw thread 31 is greater at the feed section under the hopper in order to receive a large amount of the material 34 into the supply cylinder 22. The screw has a gradually reduced thread depth towards the middle or homogenizing section 42, and thence a gradually increasing depth towards the front of the screw by the baffle/manifold 9. It results that as the material 34 received in the large space in the cylinder below the hopper 35, existing because of the small root diameter of the screw 30 at 32, is moved down the supply cylinder 22, by the forward moving rotation of the screw 30 towards the increased root diameter 36 of the screw 30, it is compressed, homogenized, mixed, and heated from the external heaters 50, as well as frictionally by the screw rotation and the higher compression at the middle. Thereafter the material is continually moved forward to the gradually decreasing barrel root diameter 37 in forward section of the screw 30, where the heat is maintained but the material is decompressed because of the decreased root diameter 37 (increased depth of the screw). At this low pressure area unwanted volatiles emanating from the melted materials may be harmlessly vented to the atmosphere or exhausted through strategically placed vent hole or holes 23 in the supply cylinder 22. Thence the material is introduced through the baffle manifold 9 in a distributed randomly oriented feed into the chamber 8.

Passages 53 and 54 in retainers 6 and 7 are provided to permit circulation of temperature control fluids, or mounting of electric heat elements to maintain the extrudable material in chamber 8 at the proper temperature. Necessary thermocouple or temperature sensing devices are used as required.

In operation, the embodiment of FIG. A would have particulate materials 34 placed in its hopper 35. The materials 34 would fall into the cylinder 22, and be moved by the forward moving rotation of the screw 30 towards the dispensing end of the cylinder and out laterally behind the baffle manifold 9. As the material 34 is moved through the cylinder 22, it will be compressed due to the increasing root diameter of the screw, reaching its greatest compression at the point of maximum screw root diameter 36, and whereat the extrudable material is normally liquefied, highly mixed, and homogenized. Continued movement down the cylinder 22, along the now decreasing screw root diameter results in pressure reduction and volatiles escaping from the material and outward through the vent hole or holes 23 in the cylinder 22 to the atmosphere or controlled exhaust.

When the liquefied material leaves the end of the cylinder, it is spread across the lateral chamber 24 rearward of the baffle/manifold 9. Herein it flows laterally across the back of the chamber and passes through the variously oriented holes 10 in the baffle/manifold 9, such that the liquefied material is randomly oriented and mixed as it enters the chamber 8. A mixer shaft such as shaft 61 and/or impinging barriers 62 of FIG. B can be included in the chamber 8, for creating a more random mix of material in the chamber.

Synchronized discharging rollers 2 and 3 will be counter rotating through the chamber and so that their engaging surfaces are moving outward together in the throat 13 of the discharging assembly 1. In doing so, they will be picking-up on their surfaces liquefied extrudable material from the chamber 8, because of the passage of their peripheries therein. The picked up materials will be setting under the influence of heat or cold and dragging additional extrudable material to the throat 13 to fully fill any space between the rollers, with any excess being squeezed back to the chamber 8. Extrudable material entrained on the roller surfaces will leave the separating surfaces of the rollers on the egress side of the chamber 8 in the form of a sheet generally indicated by the number 38, which will be slideably received on a conventional sheet take-off and sizing mechanism 14. The formation of a skin on the sheet 38 aids the clean take-off of the sheet.

As noted earlier, the surface of the rollers 2 and 3 would have been etched, machined, or otherwise formed with the depressions or cavities (or left smooth) for defining the desired material areas in the sheet 38, here shown as having the material areas 37 and through holes 39. Thus the material areas 37 will be due to entrained material in the mating cavities 15 of the rollers 2 and 3, and the thru holes 39 will be due to the mating high points 16 at line contact on the rollers 2 and 3. It should be understood that the transporting action of the rollers provide the main movement for discharging of materials from the throat 13, and not the fluid pressure in the chamber 8, which pressure is low and thus unlike the high pressures normally associated with extruding operations.

Referring now to FIG. B, it is seen that the operation is similar to FIG. A, excepting an endless belt 68 has been substituted for one of the rollers such that it interfaces with the liquefied material in chamber 8, and acts as the surface 5 of the roller 3 did in FIG. A, assisting carrying out the material through the throat 13, and transporting it outwards for more setting up or for other operations. Channels 67 within a support plate 63 are used for temperature profile control (hotter and/or colder points) via the use of temperature controlling fluids and/or electric heat elements. Some extrudable materials may not set up quickly on their own. The belt in its temperature profiled controlled condition will support and carry the extrudable material forward as necessary for setting and further operations. Mixing shaft 61 or impinging barriers 62 assure an ability to get random mixing and orientation within the chamber 8. Guide roller 64 can be used as a driver pulley or idler as desired, as can guide roller 65. As with the rollers shown in FIG. A, the belt can be surface customized to suit the product desired. Additionally a decal, circuited or interposer film 66 can be fed in between belt and extrudate sheet, for laminating or otherwise adhering as by imbedding.

Referring now to FIG. C. It is seen that the apparatus is similar to that of FIG. A and FIG. B, excepting for endless belts 71 and 72, on appropriate idler or driving rollers 2c and 3c replacing rollers 2 and 3 of FIG. A, are bathed with the liquefied chamber material, and transport the sheet 38 outward in a thickness controlled space 73 between the belts, which with temperature profile control via channels 76 in plates 74 and 75 supporting the belts, enable sizing and setting of the sheets. Left hand rollers 71C and 72C may have their axles adjusted with respect to each other to vary the belts' spacing. Thus the belts 71 and 72 interface with the liquefied extrudable material in the chamber 8, and act as the surface of the rollers would in FIG. 1, and carry out the material through the throat outward as a sheet for further transport and operations. Some extrudable materials may not set up quickly enough through use of an abbreviated throat such as in FIG. A, or use of only a bottom supported carrier as in FIG. B. The two belts enable sizing the sheet as well as the application of heat or cold to both sides of the sheet to expedite setting. As with the rollers shown in FIG. A, the belt can be surfaced customized to suit the product desired. The result is a moving thermally profiled dynamic die that encourages random orientation and is not orientation influenced by high pressures through a fixed die as with a normal extrusion operations. As shown with FIG. B, decal, circuited or interposer films 78, 79, can be introduced between belt or belts and extrudate sheet for laminating or fusing for post operations.

Referring now to FIG. D, an extrusion roller 81 is shown coacting with a flat plate 82, and having line contact as desired therewith. Here the depth of the cavities on the roller 81 would need to be such as to accommodate the entire thickness of the sheet 82, as the plate is fixed and protrusions and/or cavities thereon would limit movement of the sheet 82.

A second extrusion roller 84, is shown coacting with the underside of the flat plate 82 which may be extended to be part of the take-off mechanism. Roller 84 can be bathed in a separate material chamber 85. As shown the barrel assembly is of separated screw assemblies 86 and 87, each feeding liquefied materials to the separated chambers to bathe the multiple rollers as in the foregoing descriptions for single sheets.

Thus sheets 83 and 88 may be simultaneously formed of different materials or shapes and processed for subsequent lamination or other operations. If lamination were contemplated, the extrudable materials, and temperature profiles of the roller or rollers belt or belts plate or may be chosen to provide tough skins on the roller sides of the sheets and soft surfaces and different temperatures on the other, thereby facilitating subsequent joining and binding on the adjacent surfaces when they meet for laminating later. Additionally as shown FIG. B, or C, belts can be substituted for rollers 81 and 84, providing the attributes as described with FIGS. B and C. Again, as shown in FIGS. B and C, interposing films of choice or patterns can be fed in as desired for circuits, patterns or post operations.

Some examples of the different kinds of sheets that may be extruded using the principles of applicant's invention, are set forth in FIGS. E to H. FIG. E shows a plain sheet 90 with potential interposed circuited film 91. FIG. F shows a sheet with pyramid-like structures 92. In FIG. G, a mesh or screen 93, is shown. It is characterized by a grid of large open spaces. In FIG. H, an isometric view of a sheet 94, similar to that of FIG. A, is shown to provide a better appreciation of the material areas 95 interconnecting the through holes 96. Sheets such that depicted by 90, 91, 94, in a laminated form coupled with typical metalizations and connector via holes, would be useful in the manufacture of multi-layered electronic substrates, circuit boards and other electronic requirements. Because of the low pressure, mixed liquefied material, and dynamic moving roller or belt type die opening, sheets with low orientation, and isotropic properties, can be produced.

It will be appreciated that the applicant has provided sheet discharging apparatuses that are simple and inexpensive in operation and construction. Rollers and endless belts provide a moving and thermally profiled dynamic opening whereby liquefied extrudable material can be discharged into useful, low-stress isotropic sheets. Barrel assembly feeds are time tested and proven. Few mechanical parts are involved in the apparatus. Conventional heating and cooling techniques are widely used in it.

It will be further appreciated that three dimensional discharges of varying patterns, shapes and characteristics can be readily created, and with tough skins to hold their shapes, witness the discharges of FIGS. E-H; and in addition, the discharges can be interposed with patterned, circuited or other useful post-operation films.

It will be still further appreciated that applicant has provided a low pressure discharger, and one that does not require tight expensive seals, etc.

It will also be appreciated that applicant has provided a low pressure discharger, and one that can delivers a randomly oriented film even if the film material is of fibrous nature such as fiber filled or reinforced, or of a material that is inherently fibrous in nature such as liquid crystal polymers. This is important in that a normally anisotropic material can now be delivered with a random orientation such that the material will have properties that will approximate an isotropic material with the desirable features associated with isotropic materials.

It will be yet further appreciated that the discharged sheets are formed without distortion or severe internal stresses. At the same time the sheet shapes and patterns are being imparted by the shapes and patterns on the bathed moving surfaces, the extrudable material forming the sheet skin is just leaving at a fluid state and drags along the material forming the interior and other portions of the sheet.

While applicant has shown preferred embodiments of the invention, it will be apparent to those skilled in the art that other apparatuses embodying the principles, or combinations thereof, of the invention may be readily created. It is intended to be limited only by the spirit or scope of the appended claims.

What is claimed is:

1. In a sheet discharging apparatus, a moving element having a surface, an object having a surface opposite and in close proximity to said moving element surface so as to define an opening therebetween which can be filled by discharged material, and means juxtaposed to the element for bathing the element surface with a low pressure supply of liquefied disoriented material by exposing it to contact therewith, the element surface being movable so as to discharge the material by dragging it past by adhesion the object surface, wherein the bathing means also includes a rotatable shaft for randomly mixing a low pressure supply of liquefied extrudable material to disorient it, said low pressure supply being provided by a means including a feeder screw with respect to which the rotatable shaft is arranged transversely.

2. An apparatus according to claim 1, wherein the providing means delivers the extrudable material at a low pressure at a central area to the width of the element surface bathing means.

3. An apparatus according to claim 2, and a means connected to the providing means for delivering the extrudable material at low pressure across the width of the element surface bathing means.

4. An apparatus according to claim 1, wherein the randomly mixing means is a randomly multi-directionally apertured manifold extending across the width of the element surface bathing means.

5. An apparatus according to claim 2, wherein the providing means is a barrel screw assembly.

6. An apparatus according to claim 5, wherein the barrel screw assembly includes a cylinder secured at one end to the bathing means and having an opening at its other end for receiving particulate extrudable material from a hopper.

7. An apparatus according to claim 5, wherein the barrel screw assembly includes a screw with a smaller root diameter at one end, an increased root diameter towards the middle, and a decreased root diameter at the forward end, such that as the extrudable material being received from a hopper is transposed from a low pressure area at the one end to a gradually increasing higher pressure area near the center and thence in a liquefied area state to a lower pressure area at the forward end.

8. An apparatus according to claim 5, wherein the screw of the screw barrel assembly has its root diameter increasing towards an intermediate point in the cylinder and thereafter reducing or tapering towards the front of the cylinder to reduce the liquefied material pressure.

9. An apparatus according to claim 7, and a vent in the cylinder towards the low pressure front end to pass volatiles released during the liquefied extrudable material pressure reduction.

10. An apparatus according to claim 1, wherein the bathing means also includes impinging barrier or barriers for randomly mixing the low pressure of liquefied extrudable material.

* * * * *